July 22, 1924.

T. M. HUNTER 1,502,140

WELDING APPARATUS

Filed March 24, 1922     2 Sheets-Sheet 1

Inventor
Thomas M. Hunter
By
Gifford & Bull
his Attorneys

July 22, 1924.
T. M. HUNTER
WELDING APPARATUS
Filed March 24, 1922
1,502,140
2 Sheets-Sheet 2
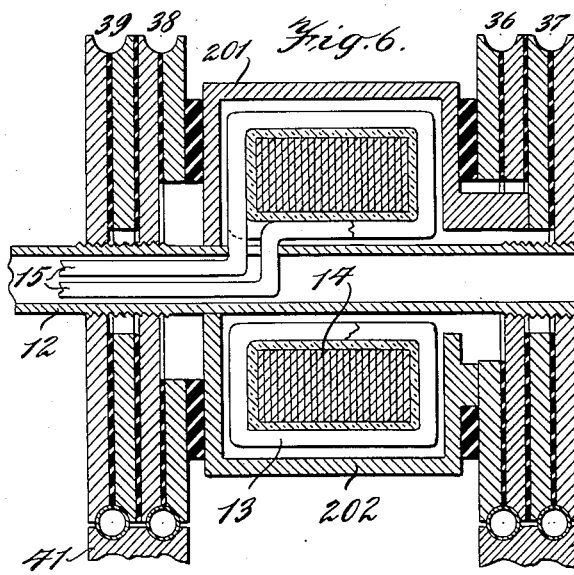
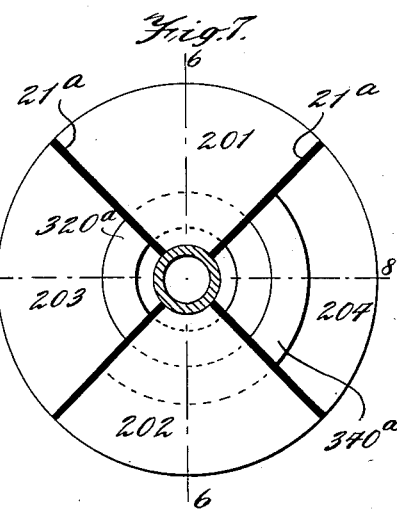
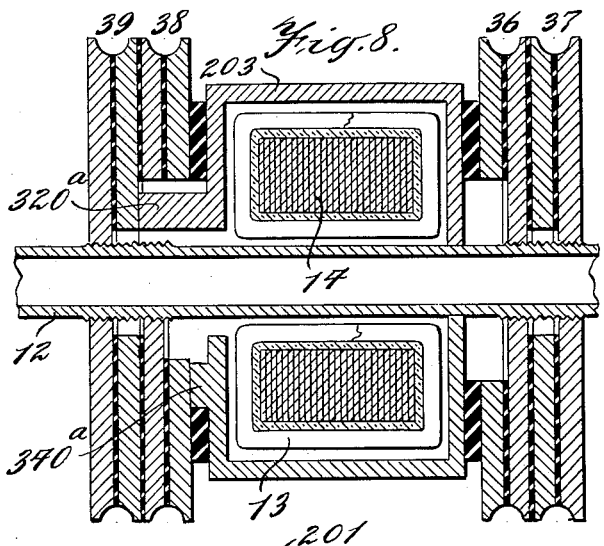
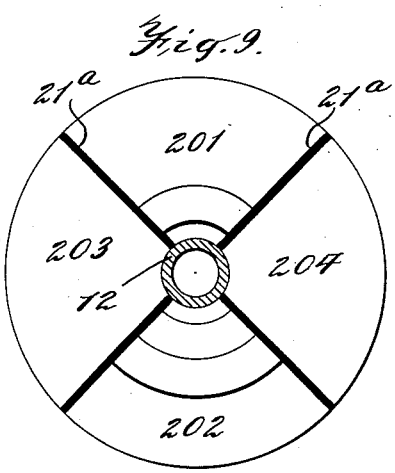
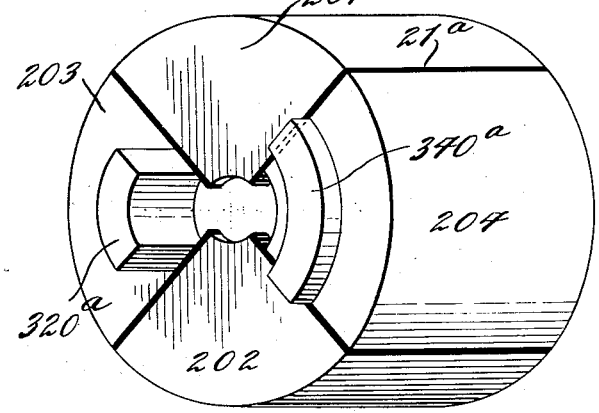
Inventor
Thomas M. Hunter
By Gifford & Bull
his Attorneys Patented July 22, 1924.

1,502,140

UNITED STATES PATENT OFFICE.

THOMAS M. HUNTER, OF NEWARK, NEW JERSEY, ASSIGNOR, BY MESNE ASSIGNMENTS, TO NEWARK TUBE COMPANY, OF NEWARK, NEW JERSEY, A CORPORATION OF NEW JERSEY.

WELDING APPARATUS.

Application filed March 24, 1922. Serial No. 546,336.

*To all whom it may concern:*

Be it known that I, THOMAS M. HUNTER, a citizen of the United States, residing at Newark, in the county of Essex and State of New Jersey, have invented certain new and useful Improvements in Welding Apparatus, of which the following is a specification.

One of the objects of my invention is a novel apparatus in accordance with which a plurality of welding or other heating operations are simultaneously carried out with a single machine. In an application, of even date herewith, in which Harlan E. Snodgrass is a joint inventor with myself, a novel method of and apparatus for simultaneously welding a plurality of tubes with a single welding machine is disclosed, and I make no claim broadly for such a method or apparatus. My present application is an improvement over the apparatus there shown, and more particularly relates to an apparatus in which a rotatable transformer is provided having a compound secondary including a plurality of sections which supply separate currents to the respective pairs of electrodes or contact members used for heating or welding. Other objects of my invention will appear in the specification, and will be more particularly pointed out in the claims.

Figure 1:
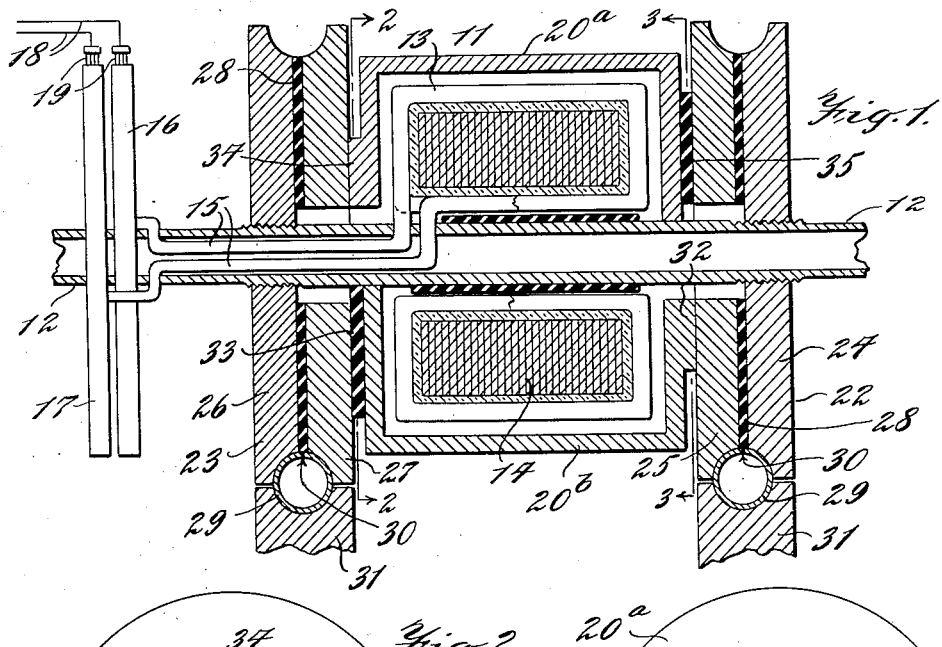
Figure 2:
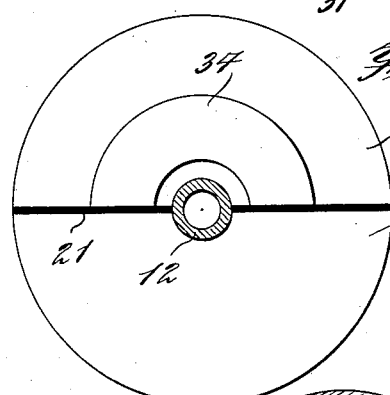
Figure 3:
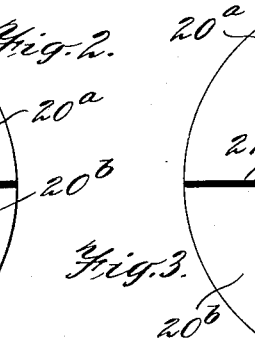
Figure 4:
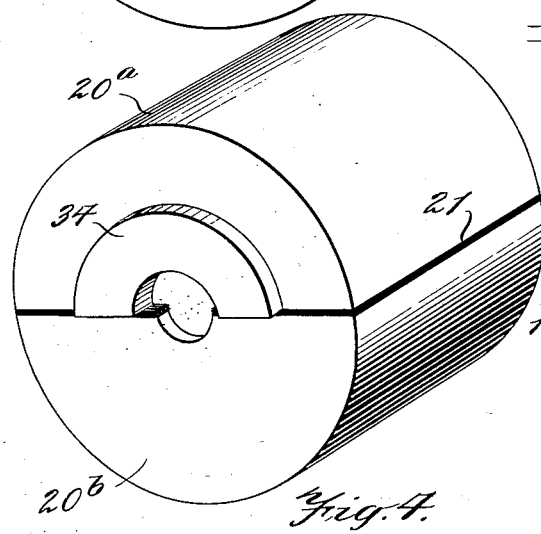
Figure 5:
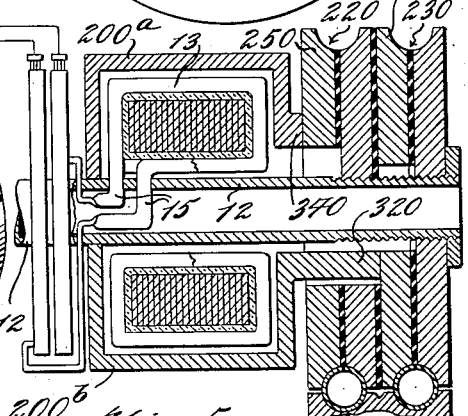

My invention will best be understood by reference to the accompanying drawings, in which Figure 1 is a vertical sectional view through a welding apparatus embodying my invention; Fig. 2 is a sectional elevation taken on the plane of the line 2—2 of Fig. 1, and looking in the direction of the arrows; Fig. 3 is a sectional elevation taken on the plane of the line 3—3 of Fig. 1, and looking in the direction of the arrows; Fig. 4 is a perspective view of the shell forming the secondaries of the transformer shown in Fig. 1; Fig. 5 is a sectional view similar to Fig. 1, illustrating a modified form of my invention, in which two or more welding rolls are mounted side by side at the same end of the transformer; Fig. 6 is a sectional view taken on the line 6—6 of Fig. 7, and showing a plurality of welding rolls side by side located at each end of the rotatable transformer; Fig. 7 is an end view of the secondary of the transformer of Fig. 6 looking from the left; Fig. 8 is a view similar to Fig. 6, taken on the line 8—8 of Fig. 7; Fig. 9 is an end view of the secondary of the transformer taken from the right of Fig. 8, and Fig. 10 is a perspective view of the secondaries of the transformer illustrated in Figs. 6, 7, 8 and 9.

Like reference characters indicate like parts throughout the drawings.

Referring, now, to the drawings, and first to Figs. 1, 2, 3 and 4, 11 indicates generally a rotatable transformer, preferably surrounding the operating shaft 12. The transformer is provided with a primary 13 surrounding an annular core 14, the terminals of the primary preferably being connected by conductors 15 to collector-rings 16 and 17, respectively, which are mounted on the shaft 12, and insulated therefrom. Current is conveyed to the collector-rings, and thence to the primary of the transformer, from a supply circuit 18 by brushes 19. In accordance with my invention, the secondary of the transformer is preferably in the form of a shell surrounding the primary and core, the shell comprising a cylindrical portion and flanged end portions, as illustrated in Fig. 1. The secondary is preferably formed with a plurality of sections, corresponding in number to the number of pairs of contact members, which engage the tube to be welded on opposite sides of the seam thereof. When there are two pairs of contact members or two welding rolls, as shown, each made up of two contact members, then the secondary of the transformer is divided into two sections 20$^a$ and 20$^b$ by insulation 21, which extends across the flanged ends of the secondary and longitudinally of the cylindrical shell, as best shown in Fig. 4. I have indicated the welding rolls at each end of the transformer generally by the reference characters 22 and 23, the roll 22 comprising contact members 24 and 25, and the welding roll 23 comprising contact members 26 and 27, the two contact members being separated by an insulating member 28, and the adjacent portions of the two contact members being recessed to form a groove, which engages the tube 29, the seam 30 of the tube registering, as the tube passes through the welding apparatus, with the insulating member 28. A roll 31 engages the tube on its lower side in the usual manner. One end of the section 20$^b$, the right-hand end as shown in Fig. 1, is electrically connected to the inner contact member 25, preferably by means of an integral raised portion 32, preferably segmental in form, as shown in Fig. 3, which is in direct engagement with the contact member 25. The opposite end of the section 20$^b$ is electrically connected to and preferably directly engages the shaft 12, but is insulated from the contact member 27, as at 33. Similarly, the end section 20$^a$ of the secondary opposite to that end of the section 20$^b$ which is electrically connected to the contact member 25, is electrically connected to the inner contact member 27 of the welding roll 23 by a raised segmental part 34, while the opposite end of the section 20$^a$ is electrically connected to the shaft 12 and insulated, as at 35, from the contact member 25. In operation, separate currents are induced in the sections 20$^a$ and 20$^b$ of the secondary of the transformer. Beginning with the secondary section 20$^a$ of the transformer, the current passes (assuming the momentary current to be in the correct direction) to the contact member 27, through the tube, to the contact member 26, the shaft 12, and to the secondary section 20$^a$. Similarly, a current is induced in the secondary section 20$^b$, which passes through the shaft to the contact member 24 of roll 22, through the tube to the contact member 25, and to the other end of section 20$^b$.

It will, of course, be understood that the shaft 12 is insulated from its bearings in a well known manner.

In Fig. 5 I have shown a modified form of my invention, in which the secondary is divided into sections in the same manner as described in connection with Figs. 1 to 4, one end of the section 200$^a$ being electrically connected, at 340, to the contact member 250 of the roll 220, the opposite end being electrically connected to the shaft 12. One end of the section 200$^b$ of the secondary is electrically connected to the section 270 of the roll 230, preferably by a raised part 320 integral with the secondary section 200$^b$ and projecting through the inner portion of the roll 220 and insulated therefrom, the raised part 320 preferably directly engaging the contact member 270. It will be apparent that currents will be induced in the two sections of the secondary, and pass through the respective contact members of the two rolls and the cooperating tubes in the same manner as described in connection with Fig. 1.

In Figs. 6, 7, 8, 9 and 10 I have illustrated my invention in connection with four welding rolls, two rolls being located at each end of the transformer, it being understood that the number of welding rolls at either or both ends of the transformer may be varied as desired. The secondary of the transformer is divided by insulation 21$^a$ into sections corresponding in number to the welding rolls, in this case four sections, 201, 202, 203, 204, one end, or terminal, of each section of the secondary being electrically connected to one of the contact members of one of the welding rolls 36, 37, 38 and 39, the opposite end, or terminal, being electrically connected to the shaft 12, which is connected to the other contact member of the given welding roll. The connections to the contact members of the inner and outer welding rolls are similar to those described in connection with Fig. 5, with the exception that the raised segments 320$^a$ and 340$^a$, at the ends of the sections, are only about 90 degrees in extent. The circuits will readily be understood from the foregoing description and the individual circuits for the separate secondaries need not be traced. Preferably, the lower sides of the tubes are engaged by rolls 40 and 41.

It will, of course, be understood that while I have illustrated the compound secondary as cylindrical in form, the invention may be carried out with other forms of secondaries; such for example, as illustrated in an application Serial No. 446,050, which was filed in the Patent Office on or about February 18, 1921, by Harlan E. Snodgrass and myself, and in which the secondary shell, in one form, is illustrated as circumferentially discontinuous.

While I have illustrated my invention in connection with an apparatus suitable for tube welding, it will, of course, be understood that my invention is equally applicable to other welding operations and to heating generally.

It will be apparent that the interruption of one of the welding circuits will not affect the other or others, and that the welding operation may proceed with such other tubes.

What I claim and desire to secure by Letters Patent of the United States is:

1. A transformer for heating and the like, comprising a single rotatable primary and a compound rotatable secondary having a plurality of insulated sections.

2. A transformer for heating and the like, comprising a single rotatable primary and a compound rotatable secondary having a plurality of insulated insulated sections insulated longitudinally of the axis of rotation.

3. A heavy current transformer for heating and the like, having a single rotatable primary and a rotatable secondary comprising a plurality of sections in which separate currents are induced.

4. A heating apparatus comprising a rotatable transformer including a plurality of secondary sections, and a plurality of pairs of electrodes to which the terminals of the respective secondary sections are connected.

5. A heating apparatus comprising a rotatable transformer including a plurality of secondary sections, and a plurality of pairs of electrodes adapted to engage separate work pieces, the terminals of said secondary sections being electrically connected to the respective pairs of electrodes.

6. A heating apparatus through which a plurality of work pieces are adapted to pass simultaneously, comprising a rotatable transformer including a plurality of secondary sections in which a plurality of welding currents are induced, and means for delivering said secondary currents to the respective work pieces as they pass progressively through the apparatus.

7. A welding apparatus for simultaneously welding a plurality of metallic seams, comprising a rotatable transformer including a plurality of secondaries in which a plurality of welding currents are induced, and means for conducting the respective welding currents across the respective seams to be welded.

8. A welding apparatus for simultaneously welding a plurality of seamed tubes, comprising a rotatable transformer including a plurality of secondaries in which a plurality of welding currents are induced, and a plurality of pairs of contact members adapted to engage the respective tubes on opposite sides of the seams thereof, the pairs of contact members being electrically connected to the opposite terminals of the respective secondaries.

9. In a welding apparatus for simultaneously welding a plurality of seamed tubes, a rotatable welding transformer, a plurality of pairs of contact members, at least one pair mounted at opposite ends of the transformer, the contact members of each pair being adapted to engage a seamed tube on opposite sides of the seam, and means for supplying welding current from the secondary of said transformer to the contact members of each pair.

10. In a welding apparatus for simultaneously welding a plurality of seamed tubes, a rotatable welding transformer, and at least one welding roll located at opposite ends of the transformer and rotatable therewith, each welding roll comprising contact members insulated from each other for engaging a tube on opposite sides of the seam thereof, and means for supplying current from the secondary of said transformer to the respective contact members of each welding roll.

11. In a welding apparatus, a rotatable transformer having a compound secondary surrounding the core and primary and divided longitudinally of the axis of rotation into a plurality of insulated sections, welding rolls associated with said transformer and corresponding in number to the insulated sections of the transformer, each roll comprising two insulated contact members engaging the tube on opposite sides of the seam thereof, the parts being constructed and arranged so that separate currents will be induced in the various sections of the secondary of the transformer and conveyed to the respective contact members of the various welding rolls.

12. In a welding apparatus, a rotatable transformer having a compound secondary surrounding the transformer and divided longitudinally of the axis of rotation into a plurality of insulated sections, welding rolls associated with said transformer and corresponding in number to the insulated sections of the transformer, each roll comprising two insulated contact members engaging the tube on opposite sides of the seam thereof, the terminals of the respective sections of said secondary being electrically connected to the contact members of the associated welding roll.

13. In a welding apparatus for simultaneously welding a plurality of tubes, a rotatable transformer comprising a compound secondary arranged around the axis of rotation and divided longitudinally of said axis into a plurality of insulated sections, a plurality of welding rolls each comprising two insulated contact members for engaging a tube on opposite sides of a tube seam, one contact member of each roll being electrically connected to a common conductor, which is, in turn, electrically connected to one terminal of each section of said secondary, the other terminals of the sections of said secondary being electrically connected to the other contact members of said rolls.

14. In a welding apparatus for simultaneously welding a plurality of tubes, a rotatable transformer comprising a compound secondary formed of a shell divided longitudinally of the axis of rotation into a plurality of insulated sections, and a plurality of welding rolls each comprising two contact members for engaging the tube on opposite sides of the seam thereof, the terminals of the various sections of the secondary being electrically connected to the two contact members of the respective welding rolls.

15. In a welding apparatus for simultaneously welding a plurality of tubes, a rotatable transformer comprising a compound secondary formed of a shell divided longitudinally of the axis of rotation into a plurality of insulated sections, a plurality of welding rolls each comprising two contact members for engaging the tube on opposite sides of the seam thereof, an operating shaft, one terminal of each secondary section being electrically connected to said shaft and the opposite terminal thereof being electrically connected to a contact member of the respective welding roll, the remaining contact members of said welding rolls being electrically connected to said shaft.

16. In a welding apparatus for simultaneously welding a plurality of tubes, a rotatable transformer comprising a compound secondary formed of a shell divided longitudinally of the axis of rotation into a plurality of insulated sections, a plurality of welding rolls each comprising two contact members for engaging the tube on opposite sides of the seam thereof, one terminal of each section of the secondary being provided with a raised part engaging one of the contact members of an associated welding roll, the remaining contact members of the various welding rolls being electrically connected to the other terminals of the secondary sections.

THOMAS M. HUNTER.